United States Patent
Takahashi

(10) Patent No.: US 10,031,349 B2
(45) Date of Patent: Jul. 24, 2018

(54) OPTICAL PRODUCT, AND SPECTACLE LENS AND SPECTACLES

(71) Applicant: TOKAI OPTICAL CO., LTD., Okazaki-Shi (JP)

(72) Inventor: Hirotoshi Takahashi, Okazaki (JP)

(73) Assignee: Tokai Optical Co., Ltd., Okazaki-Shi (JP)

( * ) Notice: Subject to any disclaimer, the term of this patent is extended or adjusted under 35 U.S.C. 154(b) by 60 days.

(21) Appl. No.: 15/194,936

(22) Filed: Jun. 28, 2016

(65) Prior Publication Data

US 2016/0306194 A1    Oct. 20, 2016

Related U.S. Application Data

(63) Continuation of application No. PCT/JP2015/052346, filed on Jan. 28, 2015.

(30) Foreign Application Priority Data

Feb. 4, 2014  (JP) .................... 2014-019631

(51) Int. Cl.
  *G02B 1/11*   (2015.01)
  *G02C 7/10*   (2006.01)
  (Continued)

(52) U.S. Cl.
  CPC .................. *G02C 7/10* (2013.01); *G02B 1/11* (2013.01); *G02B 1/115* (2013.01); *G02B 5/282* (2013.01);
  (Continued)

(58) Field of Classification Search
  CPC . G02B 1/10; G02B 1/105; G02B 1/11; G02B 1/111; G02B 1/13; G02B 1/14;
  (Continued)

(56) References Cited

U.S. PATENT DOCUMENTS 4,556,599 A    12/1985  Sato et al.
6,250,758 B1 *  6/2001  Yoshihara ............... B32B 15/08
                                            351/159.63
(Continued)

FOREIGN PATENT DOCUMENTS

EP    2 275 843 A1    1/2011
EP    2 286 985 A1    2/2011
(Continued)

OTHER PUBLICATIONS

European Search Report, European Application No. 15746576.6, dated Jul. 28, 2017 (7 pages).
(Continued)

*Primary Examiner* — Darryl J Collins
(74) *Attorney, Agent, or Firm* — Burr & Brown, PLLC

(57) ABSTRACT

An optical product has, on one or both of surfaces of a base, an optical multilayer film that has a seven-layer structure where low refractive index layers and high refractive index layers are alternately layered. The low refractive index layers are formed by using $SiO_2$. The high refractive index layers are formed by using a material where a refractive index for light having a wavelength of 500 nm is greater than or equal to 2.145. When a layer closest to the base is a first layer, a fifth layer is one of the low refractive index layers, and a physical film thickness of the fifth layer is greater than or equal to 145 nm and not greater than 165 nm. A total of optical film thicknesses of a fourth layer, the fifth layer, and a sixth layer is greater than or equal to 1.3 λ and not greater than 1.5 λ.

6 Claims, 12 Drawing Sheets

(51) Int. Cl.
*G02B 5/28* (2006.01)
*G02B 1/115* (2015.01)

(52) U.S. Cl.
CPC ............. *G02B 5/285* (2013.01); *G02C 7/104* (2013.01); *G02C 7/107* (2013.01); *G02C 2202/16* (2013.01)

(58) Field of Classification Search
CPC ... G02B 1/18; G02C 7/02; G02C 7/04; G02C 7/10; G02C 7/022; G02C 2202/16
USPC .......................... 359/642; 351/159.01, 159.02
See application file for complete search history.

(56) References Cited

U.S. PATENT DOCUMENTS

| 2009/0219620 | A1  | 9/2009 | Yamada et al. |              |
|--------------|-----|--------|---------------|--------------|
| 2013/0176615 | A1* | 7/2013 | Uefuji        | G02B 1/113   |
|              |     |        |               | 359/359      |
| 2014/0078589 | A1* | 3/2014 | Fujii         | G02B 1/115   |
|              |     |        |               | 359/601      |

FOREIGN PATENT DOCUMENTS

| EP | 2 589 992 A1  | 5/2013  |
|----|---------------|---------|
| JP | 2001-281409 A1 | 10/2001 |
| JP | 2005-292204 A1 | 10/2005 |
| JP | 2006-301489 A  | 11/2006 |
| JP | 2009-258362 A1 | 11/2009 |
| JP | 2011-100084 A1 | 5/2011  |

OTHER PUBLICATIONS

Optilayer Ltd. "Features of OptiLayer Software Family," Internet Citation, dated Apr. 21, 2010 (pp. 1-6) XP002579201, URL: http://www.optilayer.com/features.htm.

International Search Report and Written Opinion (Application No. PCT/JP2015/052346) dated Mar. 10, 2015.

Japanese Office Action (with English translation), Japanese Application No. 2014-019631, dated Apr. 24, 2018 (7 pages).

* cited by examiner

OPTICAL PRODUCT, AND SPECTACLE LENS AND SPECTACLES

This application is a Continuation of International Application No. PCT/JP2015/052346, filed on Jan. 28, 2015, which claims the benefit of Japanese Patent Application Number 2014-019631 filed on Feb. 4, 2014, the disclosures of which are incorporated by reference herein in their entireties.

BACKGROUND OF INVENTION

Technical Field

The present invention relates to optical products such as spectacle lenses (including sunglass lenses) having near-infrared reflective function, and spectacles (including sunglasses) that use the spectacle lenses and have near-infrared reflective function.

Background Art

As a filter for cutting near-infrared rays, the articles disclosed in Japanese Laid-Open Patent Publication Nos. 2009-258362 and 2011-100084 are known. The filters can be used as filters for imaging devices, or used for displays of cameras and music players or glass for automobiles. The filter has dielectric multilayer films on both surfaces of its base such that each dielectric multilayer film has silica ($SiO_2$, silicon dioxide) layers and titania ($TiO_2$, titanium dioxide) layers which are alternately layered to form 20 layers on each surface, and 40 layers are stacked in total.

SUMMARY OF THE INVENTION

Although the articles disclosed in Japanese Laid-Open Patent Publication Nos. 2009-258362 and 2011-100084 allow near-infrared rays to be cut, the number of layers in the dielectric multilayer films is 40, and cost is increased.

Further, when the number of layers is greater than or equal to 20, the thickness of the dielectric multilayer film is increased, and cracks may be generated due to influence of radiation heat during film formation, or film stress, adhesion to the base may be relatively reduced, or the base may be deformed. Thus, durability may become relatively poor.

Further, for the articles disclosed in Japanese Laid-Open Patent Publication Nos. 2009-258362 and 2011-100084, there is room for further improvement of a transmittance (antireflective properties) for light in a visible region (for example, wavelengths of 400 to 780 nm (nanometer) or 400 to 800 nm).

In particular, spectacle lenses are required to exhibit antireflective performance for light in the visible region.

Further, for the spectacle lenses, cutting of near-infrared rays has not been discussed so often as compared to cutting of ultraviolet rays or blue light. However, near-infrared rays are preferably cut for the following reasons. That is, about 70% (percent) of a crystalline lens of an eye is water, and water absorbs near-infrared rays well (water has a high near-infrared ray absorption coefficient), and an adverse effect such as increase of temperature may be gradually caused in the eye. For example, a cataract which is one of diseases of eyes may progress by ultraviolet rays or blue light passing through the crystalline lens having a temperature increased due to near-infrared rays. The near-infrared rays are light in a range of wavelengths of, for example, 800 to 2000 nm, and are emitted from the sun and poured onto the ground, similarly to ultraviolet rays or visible light. Near-infrared rays have a wavelength that is relatively greater than ultraviolet rays or blue light, and therefore an amount of light that reaches the ground is relatively reduced. However, near-infrared rays are close to light in the visible region and reach the ground in an amount that is slightly less than an amount of ultraviolet rays (in an amount that can be regarded as being equivalent to an amount of ultraviolet rays).

When a lens base is provided with the multilayer film disclosed in Japanese Laid-Open Patent Publication Nos. 2009-258362 and 2011-100084 in order to allow the spectacle lens to exhibit an effect of protection from near-infrared rays, cost may not be appropriate, durability may not be satisfactory, antireflective properties for light in the visible region may not be sufficient, and visibility may not be satisfactory.

Therefore, an object of the present invention is to provide an optical product, a spectacle lens, and spectacles which have improved antireflective performance for light in a visible region, have a lower transmittance for near-infrared rays, allow reduction of cost, and have an improved durability.

In order to attain the aforementioned object, a first aspect of the invention provides an optical product in which (1) an optical multilayer film having a seven-layer structure in which low refractive index layers and high refractive index layers are alternately layered, is formed on one or both of surfaces of a base, (2) the low refractive index layers are formed by using $SiO_2$ (silica, silicon dioxide), (3) the high refractive index layers are formed by using a material in which a refractive index for light having a wavelength of 500 nm is greater than or equal to 2.145, (4) when a layer closest to the base is a first layer, a fifth layer is one of the low refractive index layers, and a physical film thickness of the fifth layer is greater than or equal to 145 nm and not greater than 165 nm, and (5) a total of optical film thicknesses ($\lambda$=500 nm) of a fourth layer, the fifth layer, and a sixth layer is greater than or equal to $1.3\lambda$ and not greater than $1.5\lambda$.

According to a second aspect of the invention based on the above-described invention, the optical multilayer film is further formed such that (6) an average reflectance, on one surface, of light in a wavelength range in which a wavelength is greater than or equal to 800 nm and not greater than 1500 nm, is greater than or equal to 35%, and (7) a reflectance, on one surface, of light having a wavelength of 1000 nm is greater than or equal to 50%.

According to a third aspect of the invention based on the above-described invention, the optical multilayer film further satisfies the condition (8) a luminous reflectance is less than or equal to 2%.

A fourth aspect of the invention provides a spectacle lens using the optical product according to the above-described invention.

A fifth aspect of the invention provides spectacles using the spectacle lens according to the above-described invention.

The present invention exerts an effect of providing an optical product, a spectacle lens, and spectacles which sufficiently exhibit protection from near-infrared rays, have sufficiently high antireflective performance for light in a visible region, allow reduction in cost, and have a sufficient durability.

DESCRIPTION OF EMBODIMENTS

Figure 1:
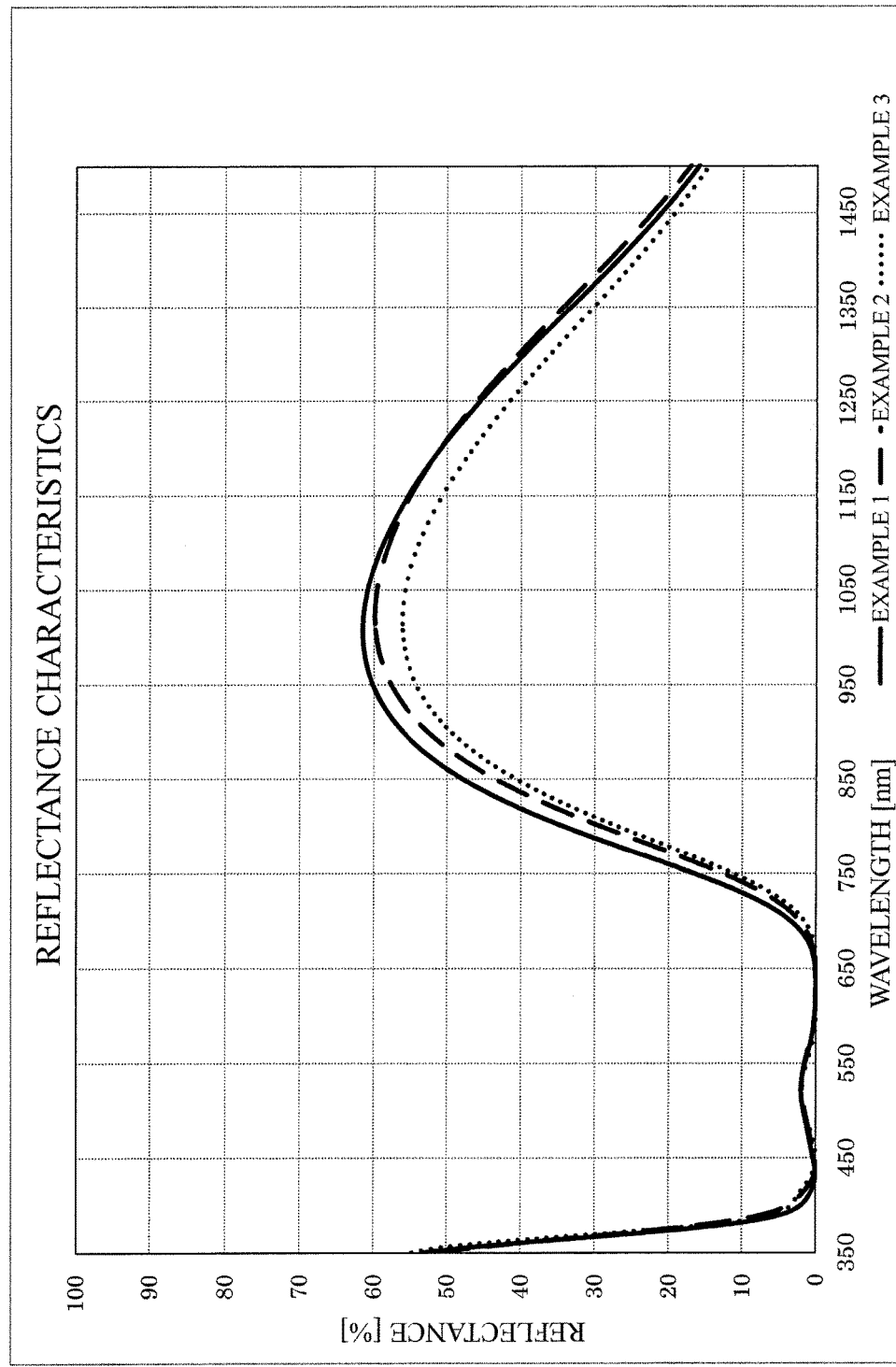
FIG. 1 is a graph showing spectral reflectance distributions from a visible region to a near-infrared region according to Examples 1 to 3.

An exemplary embodiment of the present invention will be described below with reference where appropriate to the drawings. The present invention is not limited to the exemplary embodiment described below.

A spectacle lens according to the present invention has an optical multilayer film on one surface or both surfaces of a base.

In the present invention, the base may be made of any material, and is preferably translucent. Examples of the material (base material) of the base include a polyurethane resin, a thiourethane resin, an episulfide resin, a polycarbonate resin, a polyester resin, an acrylic resin, a polyether sulfone resin, a poly(4-methylpentene-1) resin, and a diethylene glycol bis(allyl carbonate) resin. Further, examples of the material include, as a preferable material (for, in particular, a spectacle lens) having a high refractive index, an episulfide resin obtained by addition-polymerization of an episulfide group with polythiol and/or a sulfur-containing polyol.

Further, in the present invention, the optical multilayer film satisfies the following conditions. When the optical multilayer films are formed on both the surfaces, both of the films preferably satisfy the following conditions, and more preferably have the same layered structure.

Firstly, the optical multilayer film has a seven-layer structure in which low refractive index layers and high refractive index layers are alternately layered. When a nearest layer to the base (the layer closest to the base) is a first layer, odd layers are the low refractive index layers and even layers are high refractive index layers.

Next, the low refractive index layers are formed by using silica (silicon dioxide, $SiO_2$), and the high refractive index layers are formed by using a material having a refractive index of 2.145 or more with respect to light having a wavelength of 500 nm. The refractive index of the high refractive index layers can be changed according to not only a material but also film forming conditions such as a degree of vacuum in deposition, an amount of oxygen gas supplied in a unit time, presence or absence of various assists, or a film forming speed, as is known for a typical thin film. Difference in refractive index due to difference of the film forming condition is relatively less than difference in refractive index due to difference of the material. Change of a refractive index due to the film forming condition is relatively small, and a refractive index of the high refractive index layers is slightly adjusted according to the film forming condition.

Further, the physical film thickness of the fifth layer (low refractive index layer) is greater than or equal to 145 nm, and not greater than 165 nm.

In addition, the total of the optical film thicknesses ($\lambda=500$ nm) of the fourth layer (high refractive index layer), the fifth layer (low refractive index layer), and the sixth layer (high refractive index layer) is greater than or equal to $1.3\lambda$, and not greater than $1.5\lambda$.

The above-described optical multilayer film is preferably formed by a vacuum deposition method, a sputtering method, or the like.

Further, examples of the material of the high refractive index layers include titanium dioxide (titania, $TiO_2$), zirconium dioxide (zirconia, $ZrO_2$), tantalum dioxide ($TaO_2$), niobium dioxide ($NbO_2$), hafnium dioxide ($HfO_2$), and a combination thereof.

In the present invention, another kind of film such as a hard coating film or a water repellent film may be additionally provided between the optical multilayer film and the base and/or on the surface of the optical multilayer film. When the optical multilayer films are formed on both the surfaces, the kind of the film to be additionally provided may be different between both the surfaces, or whether or not the film is provided may be determined for each surface.

When a hard coating film is used as the film to be provided between the optical multilayer film and the base, the hard coating film is advantageously formed by hard coating solution being uniformly applied to the surface of the base.

Further, for the hard coating film, an organosiloxane resin containing inorganic oxide particles can be preferably used. An organosiloxane resin obtained by hydrolyzing and condensing an alkoxysilane is preferred as the organosiloxane resin. Further, specific examples of the organosiloxane resin include γ-glycidoxypropyltrimethoxysilane, γ-glycidoxypropyltriethoxysilane, methyl trimethoxysilane, ethyl silicate, and a combination thereof. The hydrolysis condensates of the alkoxysilanes are manufactured by hydrolyzing the alkoxysilane compounds or a combination thereof by an acidic aqueous solution such as hydrochloric acid.

Meanwhile, as an exemplary material of the inorganic oxide particles, specifically, a sol of zinc oxide, silicon dioxide (silica particulates), aluminum oxide, titanium oxide (titania particulates), zirconium oxide (zirconia particulates), tin oxide, beryllium oxide, antimony oxide, tungsten oxide, or cerium oxide, or mixed crystals of two or more of the sols, can be used. The diameter of the inorganic oxide particle is preferably greater than or equal to 1 nm and not greater than 100 nm, and more preferably greater than or equal to 1 nm and not greater than 50 nm in order to ensure transparency of the hard coating film. Further, an amount (concentration) of the inorganic oxide particles to be blended is preferably greater than or equal to 40% by weight of all the components of the hard coating film and not greater than 60% by weight thereof in order to ensure appropriate levels of hardness and toughness of the hard coating film. In addition, the hard coating solution may contain an acetylacetone metal salt, an ethylenediaminetetraacetic acid metal salt, and/or the like, as a curing catalyst. Further, the hard coating solution may contain a surfactant, a colorant, a solvent, or the like, as necessary for, for example, ensuring adhesion to the base, facilitating formation, and coloring with a desired (semi)transparent color.

The physical film thickness of the hard coating film is preferably greater than or equal to 0.5 μm (micrometer) and not greater than 4.0 μm. When the film thickness is in the range, a sufficient hardness is obtained and a possibility of occurrence of physical problems is not high. In other words, when the film thickness is less than the lower limit, a sufficient hardness is not obtained, and when the thickness is more than the upper limit, the possibility of occurrence of the physical problems such as generation of cracks or fragility is significantly increased.

Further, a primer layer may be additionally provided between the hard coating film and the base surface. Examples of a material of the primer layer include a polyurethane-based resin, an acrylic resin, a methacrylic resin, an organosilicon resin, and a combination thereof.

The optical product having the above-described optical multilayer film includes an optical multilayer film having seven layers. Therefore, as compared to an optical multilayer film having about 20 layers, formation is facilitated, cost is reduced, cracks due to stress or radiation heat is less likely to be generated, and adhesion to the base is improved such that separation or deformation of the base is less likely to occur, whereby durability can be improved.

Further, for light in a visible region (for example, the wavelength is greater than or equal to 400 nm and not greater than 800 nm, greater than or equal to 450 nm and not greater than 800 nm, or greater than or equal to 450 nm and not greater than 750 nm), the optical product has a high transmittance and thus has an antireflective performance. For example, for light in a wavelength range in which the wavelength is greater than or equal to 450 nm and not longer than 750 nm, the maximum reflectance is less than or equal to 4%. Further, the luminous reflectance is less than or equal to 2%.

Further, the optical product has a low transmittance for light having a wavelength in a near-infrared region, and has a function of reflecting and cutting near-infrared rays. In the present invention, the cutting of light represents not only complete blocking of light (the transmittance is 0%), but also making the transmittance less than or equal to a predetermined transmittance (for example, 90% or 80%) (in other words, making the reflectance greater than or equal to 10% or greater than or equal to 20%).

In the optical multilayer film, the average reflectance, on one surface of the base, of light in a wavelength range in which the wavelength is greater than or equal to 800 nm and not greater than 1500 nm, is greater than or equal to 35%, and the reflectance, on one surface of the base, of light having a wavelength of 1000 nm, is greater than or equal to 50%.

Further, in the optical multilayer film, while the above-described conditions are satisfied, a color of (a small amount of) of reflected light obtained by light in the visible region being slightly reflected, can be adjusted to any of various colors such as green.

In the optical product, the base is advantageously a spectacle lens base, and the optical product is a spectacle lens. Further, spectacles that allow near-infrared rays to be cut while preventing reflection of light in the visible region can be produced by using the spectacle lens.

Next, examples of the present invention according to the above-described embodiment, and comparative examples that do not belong to the present invention will be described. The embodiment of the present invention is not limited to the examples described below.

A plurality of spectacle lens bases of the same type were prepared, and intermediate films and optical multilayer films were formed on both surfaces of each spectacle lens base such that the kinds of these films are different among the spectacle lens bases, to produce the spectacle lenses according to Examples 1 to 12 and Comparative examples 1 to 4.

The spectacle lens base was a spherical lens base made of a thiourethane-based resin and having the power of S-2.00, and the refractive index was 1.60, and the Abbe number was 41, and a circular lens having a standard size as a spectacle lens was obtained.

Further, the intermediate film was implemented as a hard coating film formed by application of hard coating solution.

The hard coating solution was produced as follows.

Firstly, 206 g (grams) of methanol, 300 g of a methanol-dispersed titania sol (made by JGC Catalysts and Chemicals Ltd., solid content: 30%), 60 g of γ-glycidoxypropyltrimethoxysilane, 30 g of γ-glycidoxypropylmethyldiethoxysilane, and 60 g of tetraethoxysilane were dropped into a container, and 0.01 N (normality) of a hydrochloric acid aqueous solution was dropped into the mixed solution. The resultant mixed solution was stirred and hydrolyzed.

Then, 0.5 g of a flow regulating agent and 1.0 g of a catalyst were added, and the resultant mixed solution was stirred at room temperature for 3 hours.

This hard coat solution was applied to each surface of the spectacle lens base as follows.

That is, the hard coating solution was uniformly applied by a spin coating method, and was left as it was in an environment of 120° C. for 1.5 hours, whereby the hard coating solution was heat-cured.

In any of the hard coating films having been thus formed, the physical film thickness was 2.5 μm.

Further, for the optical multilayer films, in the same spectacle lens base, the film structure was the same on both the surfaces, and each of the optical multilayer films had a seven layer structure in which the low refractive index layers (silicon dioxide) and the high refractive index layers were alternately deposited. The film thicknesses of at least one of the low refractive index layers and the high refractive index layers, and/or the refractive index (material or film forming method) of the high refractive index layer are different for each of Examples 1 to 12 and Comparative examples 1 to 4.

Each of the optical multilayer films according to Examples 1 to 12 and Comparative examples 1 to 4 was formed by a vacuum deposition method.

The odd layers (the first, the third, the fifth, the seventh layers) were the low refractive index layers, and were formed of silicon dioxide. The even layers (the second, the fourth, the sixth layers) were the high refractive index layers, and were formed of a high refractive index material having a refractive index higher than silicon dioxide.

The refractive index of the high refractive index layer basically depends on a selected material. However, the refractive index can be adjusted by a film forming rate (speed for forming a film), a pressure for film formation, an ion-assisted process, and the like.

In Examples 1 to 4 and 7 to 10, as a material of the high refractive index layers, titanium dioxide was selected and a pressure for film formation and an ion-assisted condition were changed, so that the refractive index was made different one another. The pressure for film formation is adjusted by, for example, a degree of vacuum in a deposition chamber, or an introduced amount of oxygen gas and/or argon gas per unit time if oxygen gas and/or argon gas are slightly introduced. Further, the ion-assisted condition can be changed according to a voltage or an operation pattern (on/off-state) of an ion gun in the case of oxygen ions and/or argon ions being obtained from oxygen molecules and/or argon molecules in oxygen gas and/or argon gas by using the ion gun or the like. The ion-assisted condition can also be changed according to an introduced amount of each of various gases.

In Examples 5, 6, 11, and 12 and Comparative examples 1 to 4, as a material of the high refractive index layers, zirconium dioxide was selected and a pressure for film formation and an ion-assisted condition were changed, so that the refractive index was made different one another, similarly to a case of titanium dioxide being used.

In Examples 1 to 12 and Comparative examples 1 to 4, an antireflective function for light in the visible region was exhibited. However, a small amount of reflected light (reflectance was up to about 3% or less) was present. Examples 1 to 6 and Comparative examples 1 and 2 were designed such that the reflected light was colored green. Examples 7 to 12 and Comparative examples 3 and 4 were designed such that the reflected light was colored blue.

Next, in [Table 1] to [Table 12], the refractive index, the film thicknesses, and the like of each layer in the optical multilayer film of each of Examples 1 to 12, are indicated. In [Table 13] to [Table 16], the refractive index, the film thicknesses, and the like of each layer in the optical multilayer film in each of Comparative examples 1 to 4, are indicated.

TABLE 1

Example 1

| Layer | Material | Refractive index | Physical film thickness [nm] | Optical film thickness × λ |
|---|---|---|---|---|
| First layer | SiO$_2$ | 1.4704 | 138.69 | 0.408 |
| Second layer | TiO$_2$ | 2.4813 | 7.41 | 0.037 |
| Third layer | SiO$_2$ | 1.4704 | 31.71 | 0.093 |
| Fourth layer | TiO$_2$ | 2.4813 | 103.23 | 0.512 |
| Fifth layer | SiO$_2$ | 1.4704 | 159.88 | 0.470 |
| Sixth layer | TiO$_2$ | 2.4813 | 99.88 | 0.496 |
| Seventh layer | SiO$_2$ | 1.4704 | 76.88 | 0.226 |

The total of optical film thicknesses of the fourth layer, the fifth layer, and the sixth layer: 1.478λ.

TABLE 2

Example 2

| Layer | Material | Refractive index | Physical film thickness [nm] | Optical film thickness × λ |
|---|---|---|---|---|
| First layer | SiO$_2$ | 1.4704 | 152.32 | 0.448 |
| Second layer | TiO$_2$ | 2.4176 | 9.00 | 0.044 |
| Third layer | SiO$_2$ | 1.4704 | 26.43 | 0.078 |
| Fourth layer | TiO$_2$ | 2.4176 | 104.93 | 0.507 |
| Fifth layer | SiO$_2$ | 1.4704 | 161.52 | 0.475 |
| Sixth layer | TiO$_2$ | 2.4176 | 101.82 | 0.492 |
| Seventh layer | SiO$_2$ | 1.4704 | 76.16 | 0.224 |

The total of optical film thicknesses of the fourth layer, the fifth layer, and the sixth layer: 1.475λ.

TABLE 3

Example 3

| Layer | Material | Refractive index | Physical film thickness [nm] | Optical film thickness × λ |
|---|---|---|---|---|
| First layer | SiO$_2$ | 1.4704 | 135.20 | 0.398 |
| Second layer | TiO$_2$ | 2.3351 | 7.74 | 0.036 |
| Third layer | SiO$_2$ | 1.4704 | 28.19 | 0.083 |
| Fourth layer | TiO$_2$ | 2.3351 | 110.58 | 0.516 |
| Fifth layer | SiO$_2$ | 1.4704 | 161.31 | 0.474 |
| Sixth layer | TiO$_2$ | 2.3351 | 103.05 | 0.481 |
| Seventh layer | SiO$_2$ | 1.4704 | 78.08 | 0.230 |

The total of optical film thicknesses of the fourth layer, the fifth layer, and the sixth layer: 1.472λ.

TABLE 4

Example 4

| Layer | Material | Refractive index | Physical film thickness [nm] | Optical film thickness × λ |
|---|---|---|---|---|
| First layer | SiO$_2$ | 1.4704 | 167.47 | 0.492 |
| Second layer | TiO$_2$ | 2.2410 | 14.94 | 0.067 |
| Third layer | SiO$_2$ | 1.4704 | 18.68 | 0.055 |
| Fourth layer | TiO$_2$ | 2.2410 | 99.32 | 0.445 |
| Fifth layer | SiO$_2$ | 1.4704 | 162.03 | 0.476 |
| Sixth layer | TiO$_2$ | 2.2410 | 103.21 | 0.463 |
| Seventh layer | SiO$_2$ | 1.4704 | 67.09 | 0.197 |

The total of optical film thicknesses of the fourth layer, the fifth layer, and the sixth layer: 1.384λ.

TABLE 5

Example 5

| Layer | Material | Refractive index | Physical film thickness [nm] | Optical film thickness × λ |
|---|---|---|---|---|
| First layer | SiO$_2$ | 1.4704 | 148.53 | 0.437 |
| Second layer | ZrO$_2$ | 2.1795 | 10.61 | 0.046 |
| Third layer | SiO$_2$ | 1.4704 | 19.63 | 0.058 |
| Fourth layer | ZrO$_2$ | 2.1795 | 108.99 | 0.475 |
| Fifth layer | SiO$_2$ | 1.4704 | 154.90 | 0.456 |
| Sixth layer | ZrO$_2$ | 2.1795 | 105.63 | 0.460 |
| Seventh layer | SiO$_2$ | 1.4704 | 81.52 | 0.240 |

The total of optical film thicknesses of the fourth layer, the fifth layer, and the sixth layer: 1.391λ.

TABLE 6

Example 6

| Layer | Material | Refractive index | Physical film thickness [nm] | Optical film thickness × λ |
|---|---|---|---|---|
| First layer | SiO$_2$ | 1.4704 | 167.91 | 0.494 |
| Second layer | ZrO$_2$ | 2.1454 | 15.96 | 0.068 |
| Third layer | SiO$_2$ | 1.4704 | 16.53 | 0.049 |
| Fourth layer | ZrO$_2$ | 2.1454 | 102.96 | 0.442 |
| Fifth layer | SiO$_2$ | 1.4704 | 157.23 | 0.462 |
| Sixth layer | ZrO$_2$ | 2.1454 | 106.70 | 0.458 |
| Seventh layer | SiO$_2$ | 1.4704 | 71.22 | 0.209 |

The total of optical film thicknesses of the fourth layer, the fifth layer, and the sixth layer: 1.362λ.

TABLE 7

Example 7

| Layer | Material | Refractive index | Physical film thickness [nm] | Optical film thickness × λ |
|---|---|---|---|---|
| First layer | SiO$_2$ | 1.4704 | 101.40 | 0.298 |
| Second layer | TiO$_2$ | 2.4813 | 6.36 | 0.032 |
| Third layer | SiO$_2$ | 1.4704 | 52.39 | 0.154 |
| Fourth layer | TiO$_2$ | 2.4813 | 110.42 | 0.548 |
| Fifth layer | SiO$_2$ | 1.4704 | 158.71 | 0.467 |
| Sixth layer | TiO$_2$ | 2.4813 | 97.08 | 0.482 |
| Seventh layer | SiO$_2$ | 1.4704 | 70.26 | 0.207 |

The total of optical film thicknesses of the fourth layer, the fifth layer, and the sixth layer: 1.496λ.

TABLE 8

Example 8

| Layer | Material | Refractive index | Physical film thickness [nm] | Optical film thickness × λ |
|---|---|---|---|---|
| First layer | SiO$_2$ | 1.4704 | 107.12 | 0.315 |
| Second layer | TiO$_2$ | 2.4176 | 5.28 | 0.026 |
| Third layer | SiO$_2$ | 1.4704 | 50.75 | 0.149 |
| Fourth layer | TiO$_2$ | 2.4176 | 109.33 | 0.529 |
| Fifth layer | SiO$_2$ | 1.4704 | 152.09 | 0.447 |
| Sixth layer | TiO$_2$ | 2.4176 | 98.98 | 0.479 |
| Seventh layer | SiO$_2$ | 1.4704 | 71.88 | 0.211 |

The total of optical film thicknesses of the fourth layer, the fifth layer, and the sixth layer: 1.454λ.

TABLE 9

Example 9

| Layer | Material | Refractive index | Physical film thickness [nm] | Optical film thickness × λ |
|---|---|---|---|---|
| First layer | SiO$_2$ | 1.4704 | 114.31 | 0.336 |
| Second layer | TiO$_2$ | 2.3351 | 5.37 | 0.025 |
| Third layer | SiO$_2$ | 1.4704 | 49.35 | 0.145 |
| Fourth layer | TiO$_2$ | 2.3351 | 112.52 | 0.525 |
| Fifth layer | SiO$_2$ | 1.4704 | 154.17 | 0.453 |
| Sixth layer | TiO$_2$ | 2.3351 | 102.88 | 0.480 |
| Seventh layer | SiO$_2$ | 1.4704 | 70.67 | 0.208 |

The total of optical film thicknesses of the fourth layer, the fifth layer, and the sixth layer: 1.459λ.

TABLE 10

Example 10

| Layer | Material | Refractive index | Physical film thickness [nm] | Optical film thickness × λ |
|---|---|---|---|---|
| First layer | SiO$_2$ | 1.4704 | 106.72 | 0.314 |
| Second layer | TiO$_2$ | 2.2410 | 5.59 | 0.025 |
| Third layer | SiO$_2$ | 1.4704 | 53.60 | 0.158 |
| Fourth layer | TiO$_2$ | 2.2410 | 120.10 | 0.538 |
| Fifth layer | SiO$_2$ | 1.4704 | 151.51 | 0.446 |
| Sixth layer | TiO$_2$ | 2.2410 | 103.34 | 0.463 |
| Seventh layer | SiO$_2$ | 1.4704 | 71.21 | 0.209 |

The total of optical film thicknesses of the fourth layer, the fifth layer, and the sixth layer: 1.447λ.

TABLE 11

Example 11

| Layer | Material | Refractive index | Physical film thickness [nm] | Optical film thickness × λ |
|---|---|---|---|---|
| First layer | SiO$_2$ | 1.4704 | 106.74 | 0.314 |
| Second layer | ZrO$_2$ | 2.1795 | 5.73 | 0.025 |
| Third layer | SiO$_2$ | 1.4704 | 53.69 | 0.158 |
| Fourth layer | ZrO$_2$ | 2.1795 | 121.57 | 0.530 |
| Fifth layer | SiO$_2$ | 1.4704 | 148.95 | 0.438 |
| Sixth layer | ZrO$_2$ | 2.1795 | 104.35 | 0.455 |
| Seventh layer | SiO$_2$ | 1.4704 | 70.41 | 0.207 |

The total of optical film thicknesses of the fourth layer, the fifth layer, and the sixth layer: 1.423λ.

TABLE 12

Example 12

| Layer | Material | Refractive index | Physical film thickness [nm] | Optical film thickness × λ |
|---|---|---|---|---|
| First layer | SiO$_2$ | 1.4704 | 108.83 | 0.320 |
| Second layer | ZrO$_2$ | 2.1454 | 5.95 | 0.026 |
| Third layer | SiO$_2$ | 1.4704 | 53.58 | 0.158 |
| Fourth layer | ZrO$_2$ | 2.1454 | 126.60 | 0.543 |
| Fifth layer | SiO$_2$ | 1.4704 | 151.27 | 0.445 |
| Sixth layer | ZrO$_2$ | 2.1454 | 104.01 | 0.446 |
| Seventh layer | SiO$_2$ | 1.4704 | 70.32 | 0.207 |

The total of optical film thicknesses of the fourth layer, the fifth layer, and the sixth layer: 1.434λ.

TABLE 13

Comparative example 1

| Layer | Material | Refractive index | Physical film thickness [nm] | Optical film thickness × λ |
|---|---|---|---|---|
| First layer | SiO$_2$ | 1.4704 | 164.64 | 0.484 |
| Second layer | ZrO$_2$ | 2.1071 | 17.90 | 0.075 |
| Third layer | SiO$_2$ | 1.4704 | 16.33 | 0.048 |
| Fourth layer | ZrO$_2$ | 2.1071 | 98.57 | 0.415 |
| Fifth layer | SiO$_2$ | 1.4704 | 154.84 | 0.455 |
| Sixth layer | ZrO$_2$ | 2.1071 | 107.39 | 0.453 |
| Seventh layer | SiO$_2$ | 1.4704 | 76.88 | 0.226 |

The total of optical film thicknesses of the fourth layer, the fifth layer, and the sixth layer: 1.323λ.

TABLE 14

Comparative example 2

| Layer | Material | Refractive index | Physical film thickness [nm] | Optical film thickness × λ |
|---|---|---|---|---|
| First layer | SiO$_2$ | 1.4704 | 160.06 | 0.471 |
| Second layer | ZrO$_2$ | 2.0577 | 20.83 | 0.086 |
| Third layer | SiO$_2$ | 1.4704 | 15.10 | 0.044 |
| Fourth layer | ZrO$_2$ | 2.0577 | 91.64 | 0.377 |
| Fifth layer | SiO$_2$ | 1.4704 | 155.40 | 0.457 |
| Sixth layer | ZrO$_2$ | 2.0577 | 108.15 | 0.445 |
| Seventh layer | SiO$_2$ | 1.4704 | 72.39 | 0.213 |

The total of optical film thicknesses of the fourth layer, the fifth layer, and the sixth layer: 1.279λ.

TABLE 15

Comparative example 3

| Layer | Material | Refractive index | Physical film thickness [nm] | Optical film thickness × λ |
|---|---|---|---|---|
| First layer | $SiO_2$ | 1.4704 | 116.97 | 0.344 |
| Second layer | $ZrO_2$ | 2.1071 | 5.90 | 0.025 |
| Third layer | $SiO_2$ | 1.4704 | 48.14 | 0.142 |
| Fourth layer | $ZrO_2$ | 2.1071 | 126.71 | 0.534 |
| Fifth layer | $SiO_2$ | 1.4704 | 145.11 | 0.427 |
| Sixth layer | $ZrO_2$ | 2.1071 | 102.89 | 0.434 |
| Seventh layer | $SiO_2$ | 1.4704 | 70.17 | 0.206 |

The total of optical film thicknesses of the fourth layer, the fifth layer, and the sixth layer: 1.394λ.

TABLE 16

Comparative example 4

| Layer | Material | Refractive index | Physical film thickness [nm] | Optical film thickness × λ |
|---|---|---|---|---|
| First layer | $SiO_2$ | 1.4704 | 89.41 | 0.263 |
| Second layer | $ZrO_2$ | 2.0577 | 7.32 | 0.030 |
| Third layer | $SiO_2$ | 1.4704 | 58.00 | 0.171 |
| Fourth layer | $ZrO_2$ | 2.0577 | 130.88 | 0.539 |
| Fifth layer | $SiO_2$ | 1.4704 | 147.51 | 0.434 |
| Sixth layer | $ZrO_2$ | 2.0577 | 106.71 | 0.439 |
| Seventh layer | $SiO_2$ | 1.4704 | 67.52 | 0.199 |

The total of optical film thicknesses of the fourth layer, the fifth layer, and the sixth layer: 1.412λ.

Figure 2:
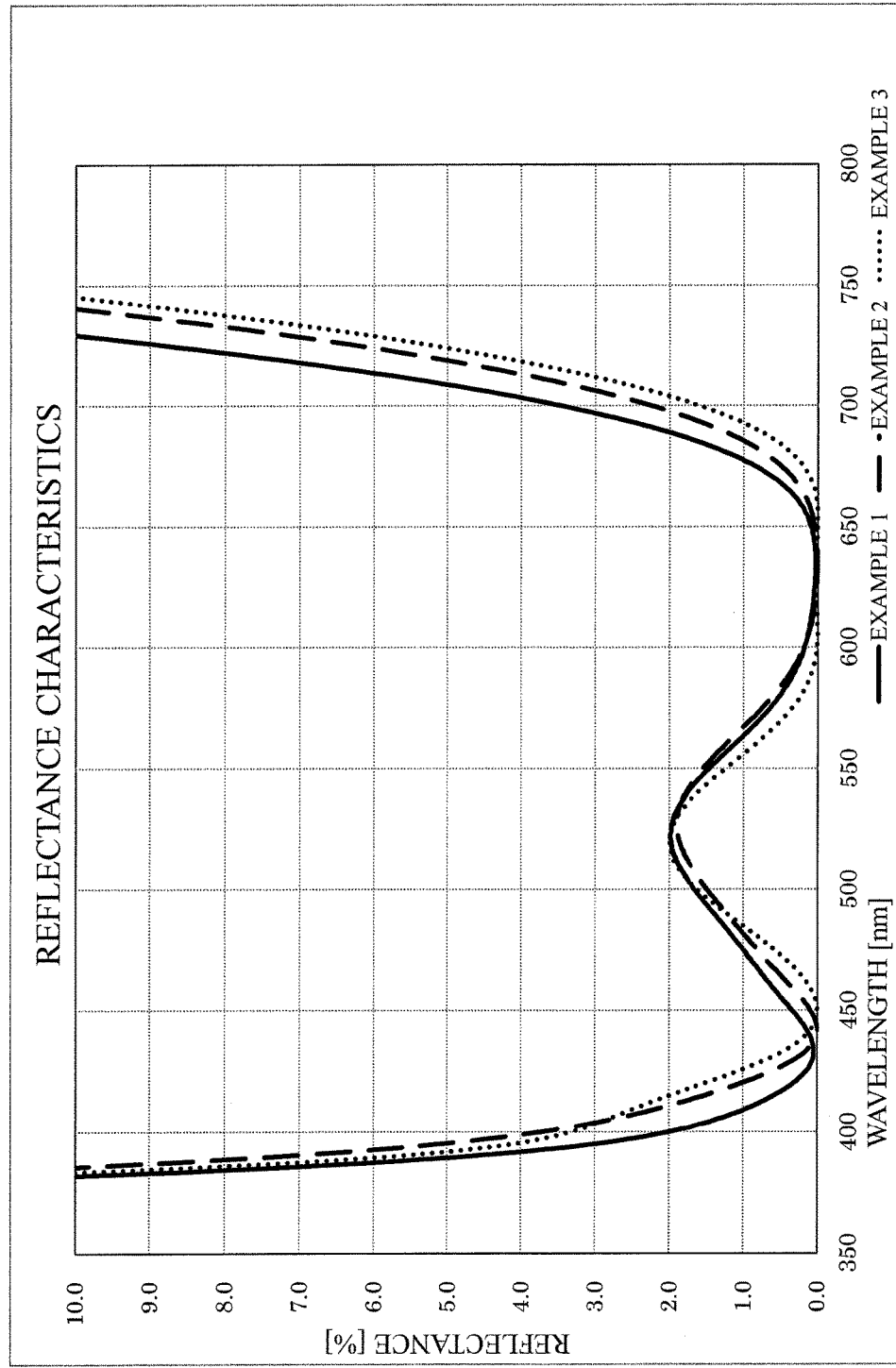
FIG. 2 is a graph showing the spectral reflectance distributions in the visible region according to Examples 1 to 3.
Figure 3:
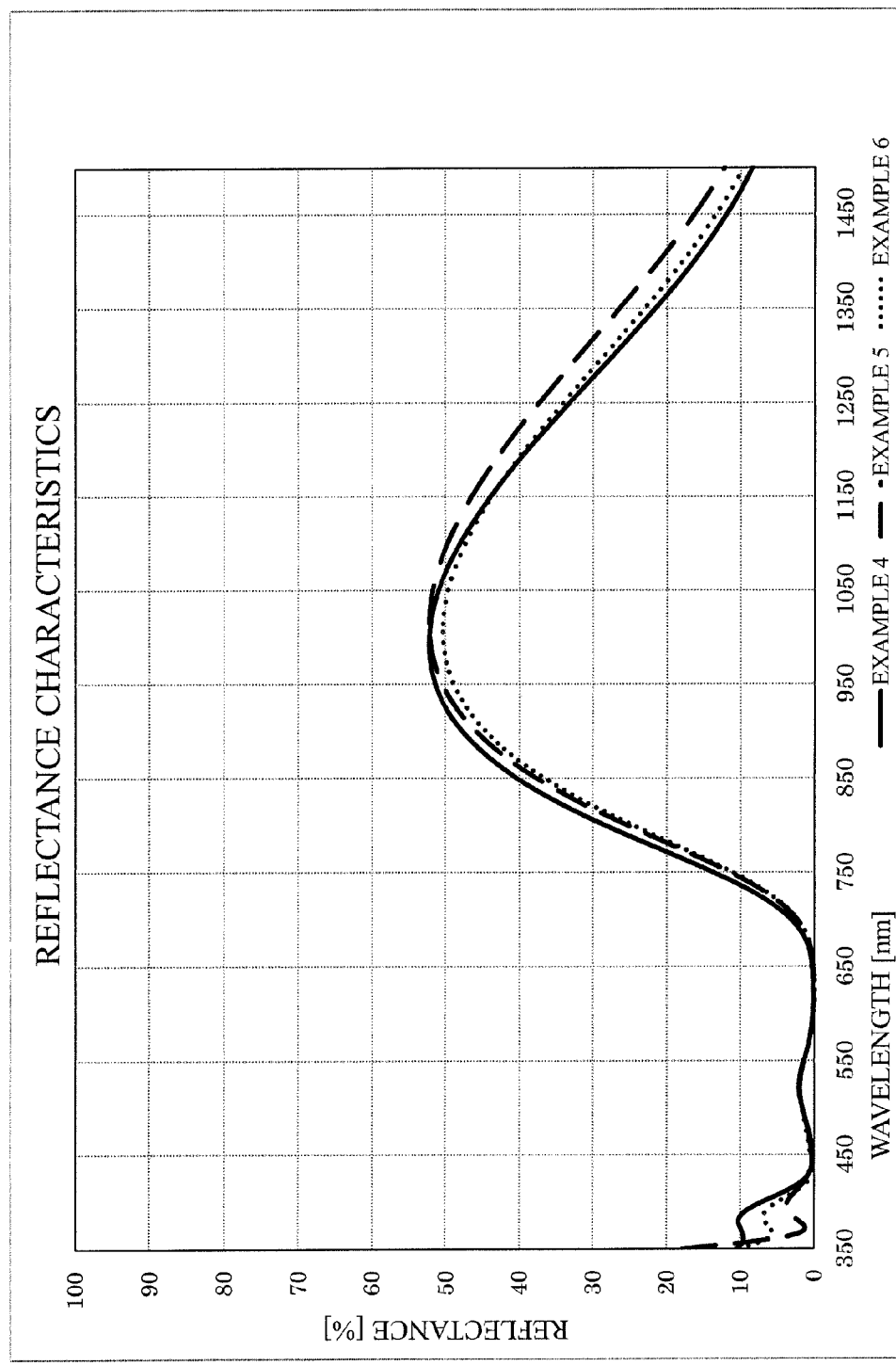
FIG. 3 is a graph showing spectral reflectance distributions from the visible region to the near-infrared region according to Examples 4 to 6.
Figure 4:
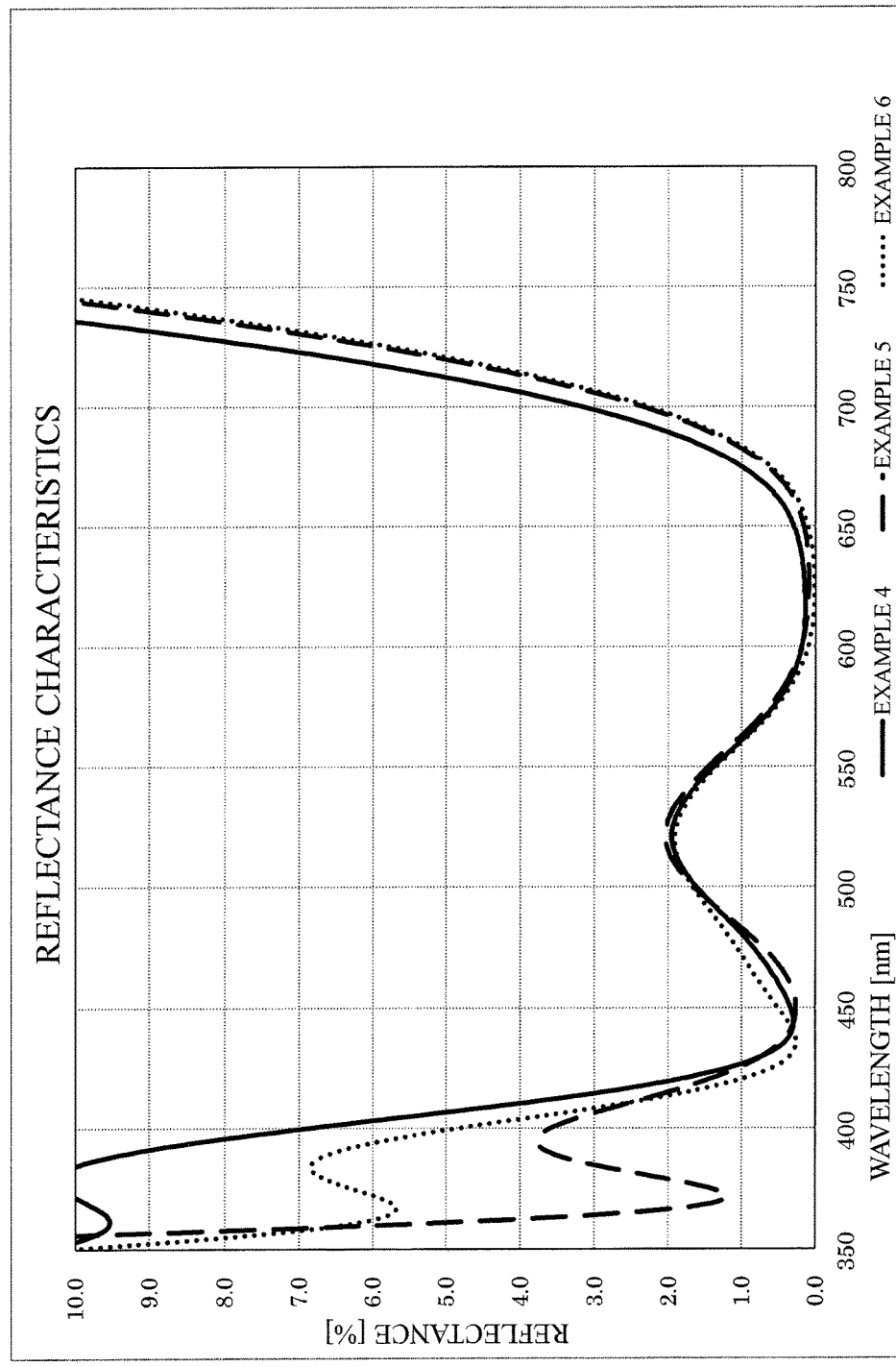
FIG. 4 is a graph showing the spectral reflectance distributions in the visible region according to Examples 4 to 6.
Figure 5:
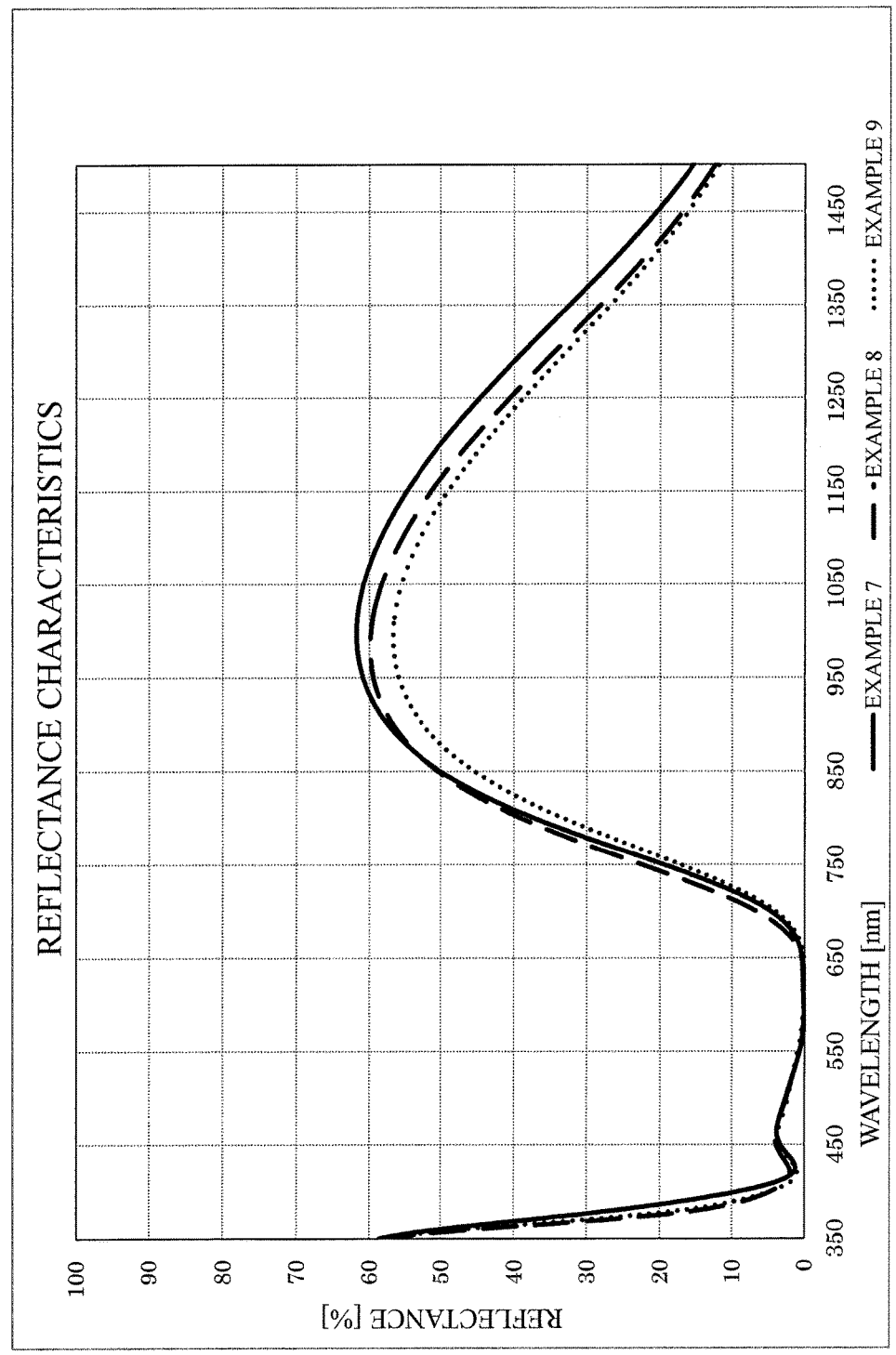
FIG. 5 is a graph showing spectral reflectance distributions from the visible region to the near-infrared region according to Examples 7 to 9.
Figure 6:
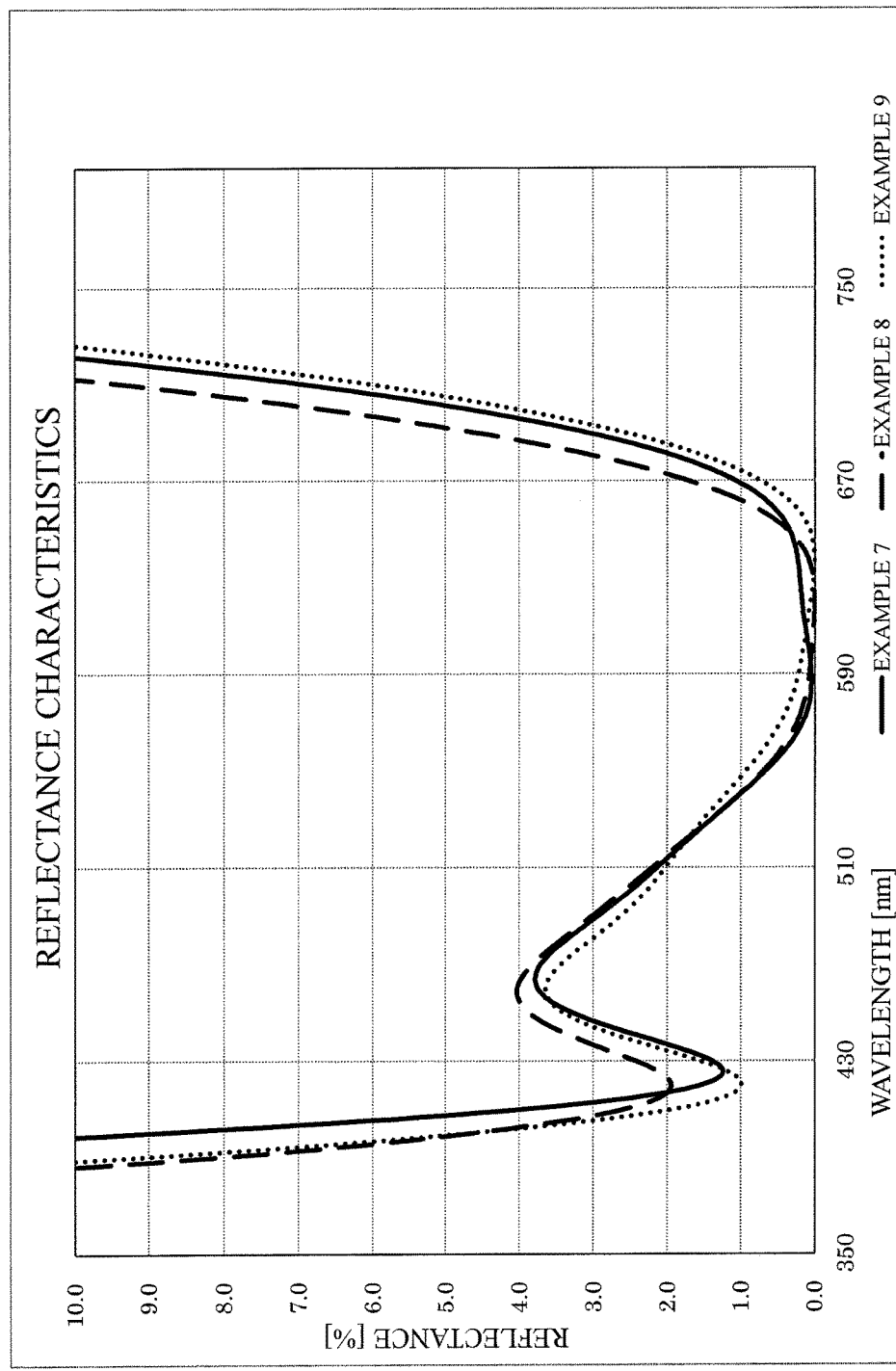
FIG. 6 is a graph showing the spectral reflectance distributions in the visible region according to Examples 7 to 9.
Figure 7:
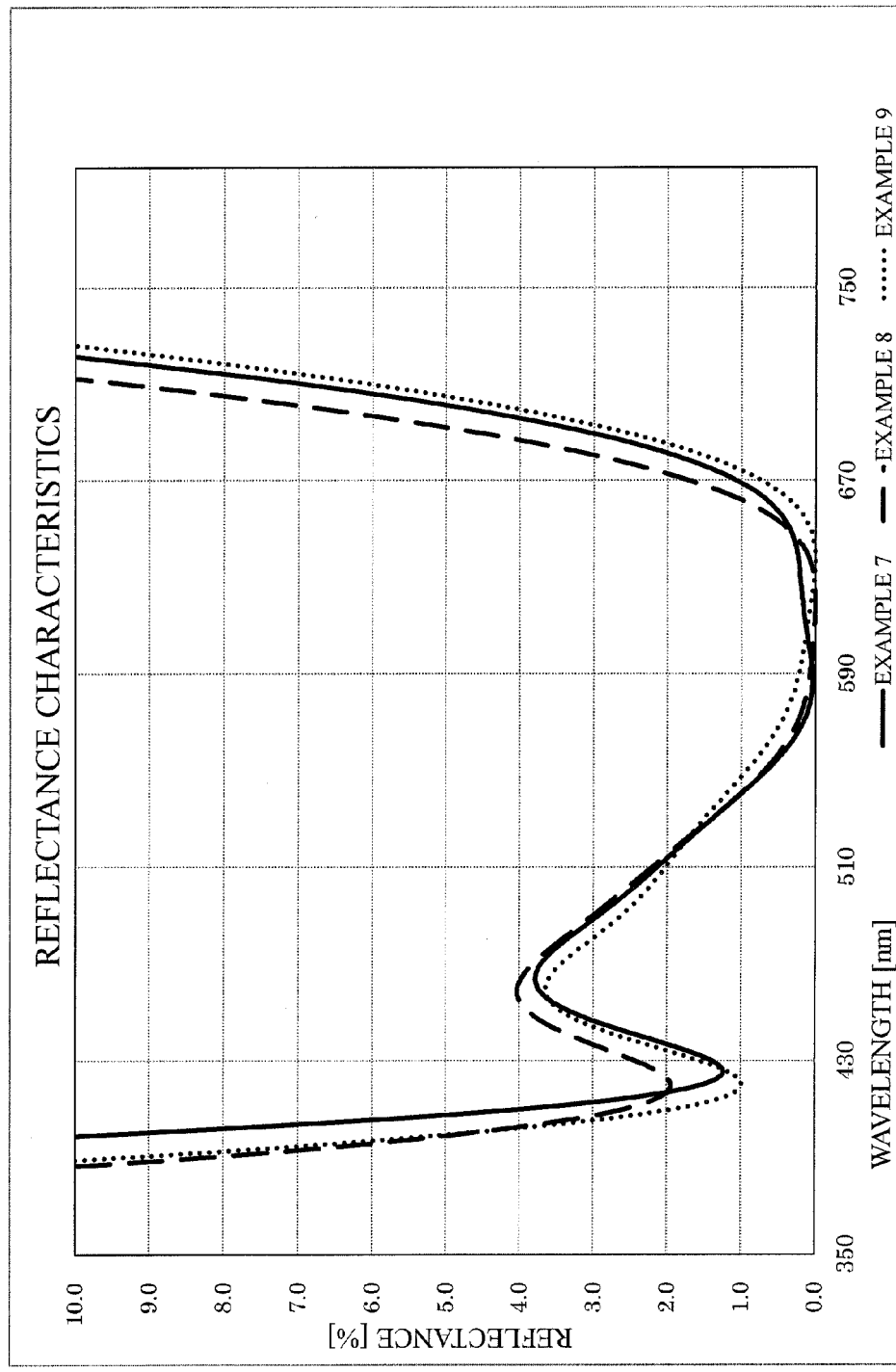
FIG. 7 is a graph showing spectral reflectance distributions from the visible region to the near-infrared region according to Examples 10 to 12.
Figure 8:
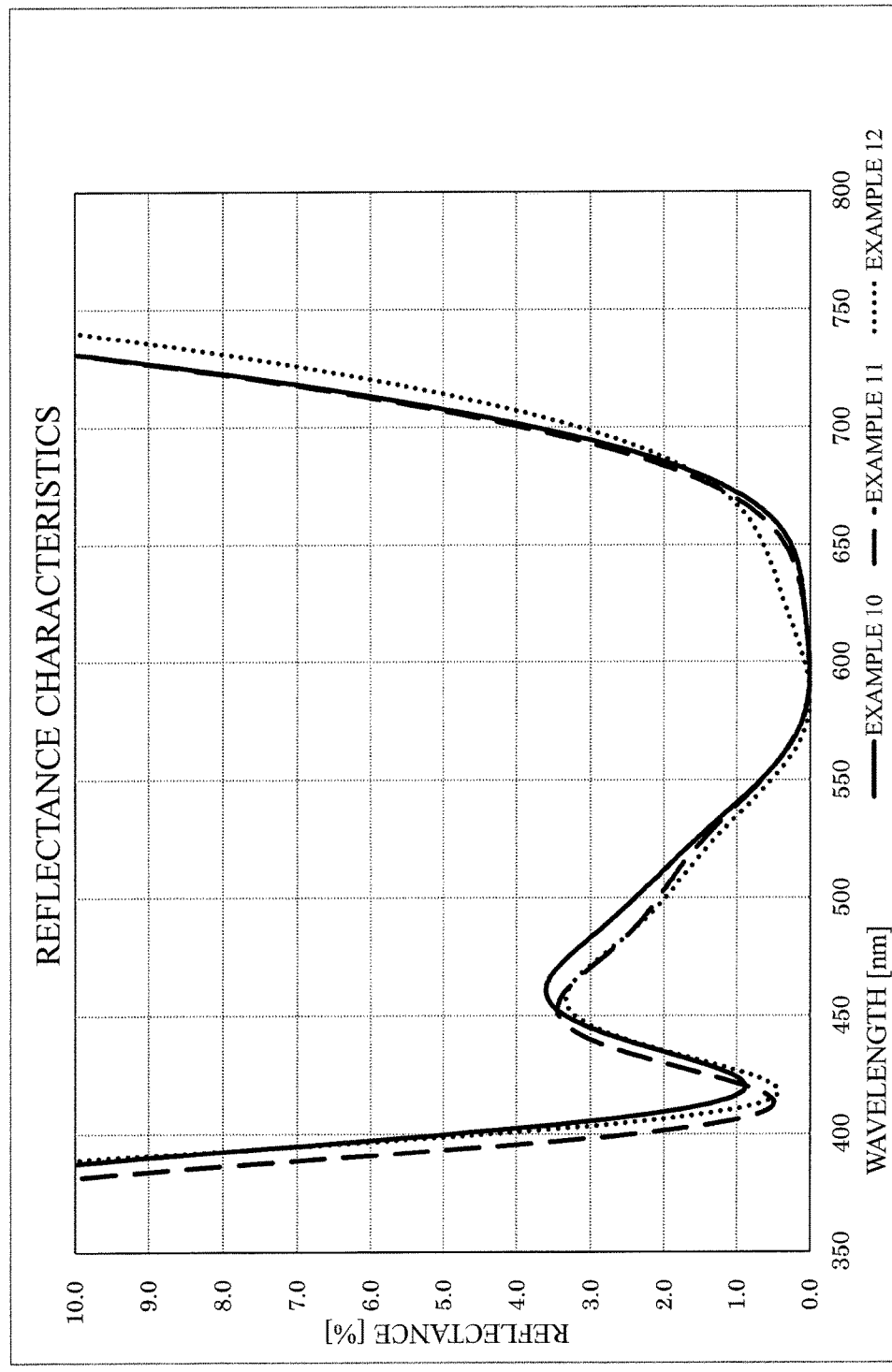
FIG. 8 is a graph showing the spectral reflectance distributions in the visible region according to Examples 10 to 12.
Figure 9:
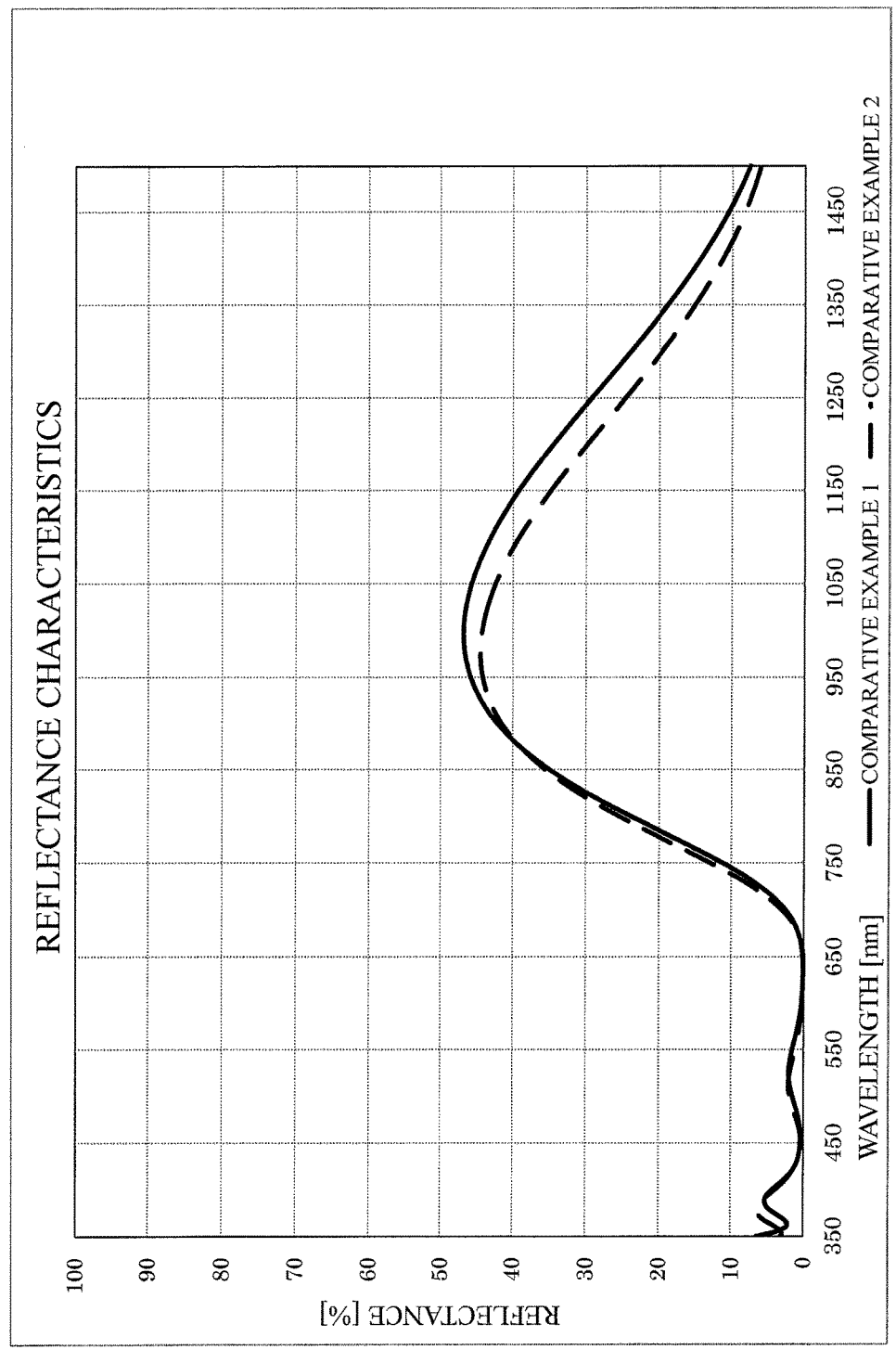
FIG. 9 is a graph showing spectral reflectance distributions from the visible region to the near-infrared region according to Comparative examples 1 to 2.
Figure 10:
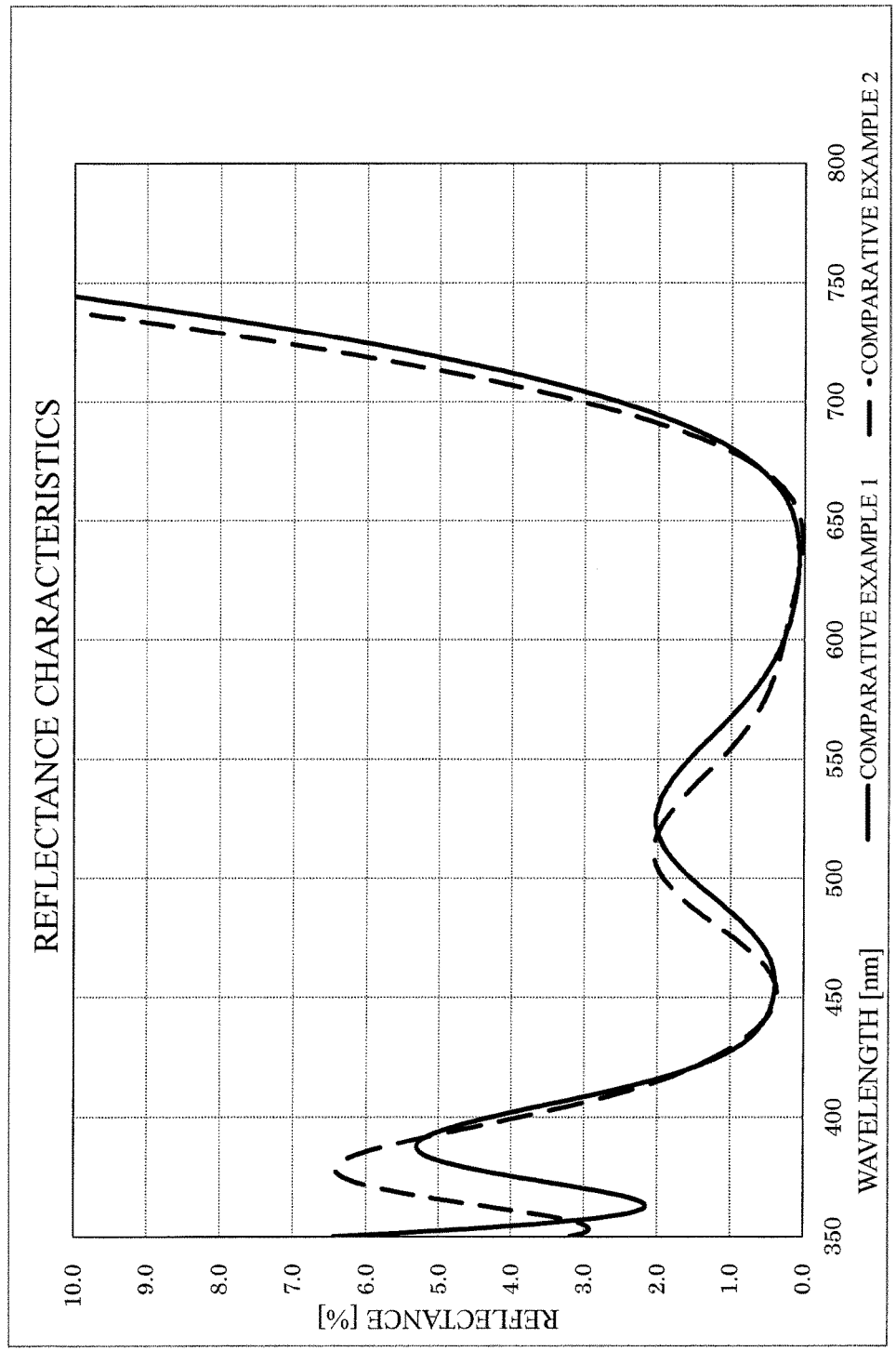
FIG. 10 is a graph showing the spectral reflectance distributions in the visible region according to Comparative examples 1 to 2.
Figure 11:
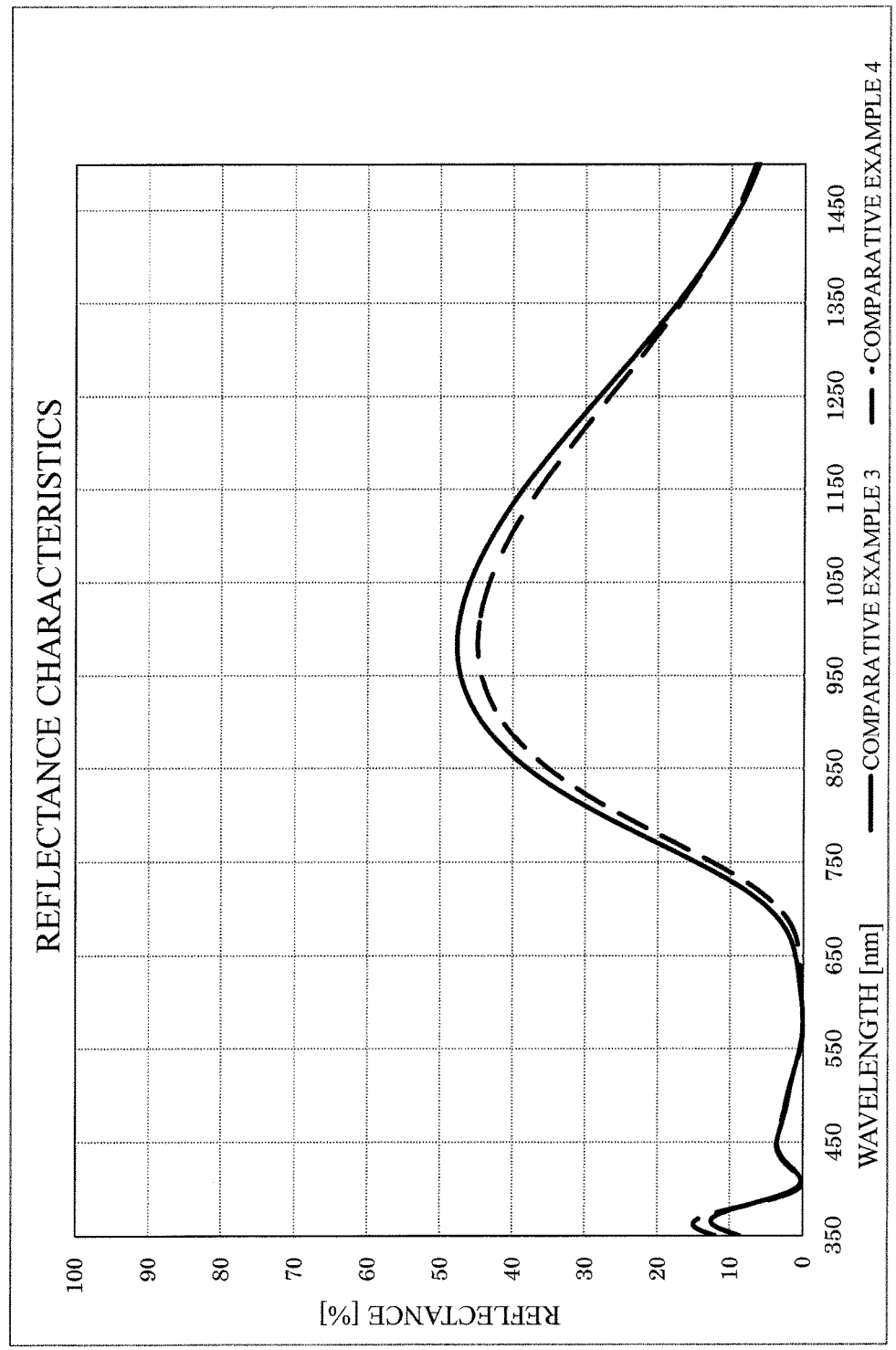
FIG. 11 is a graph showing spectral reflectance distributions from the visible region to the near-infrared region according to Comparative examples 3 to 4.
Figure 12:
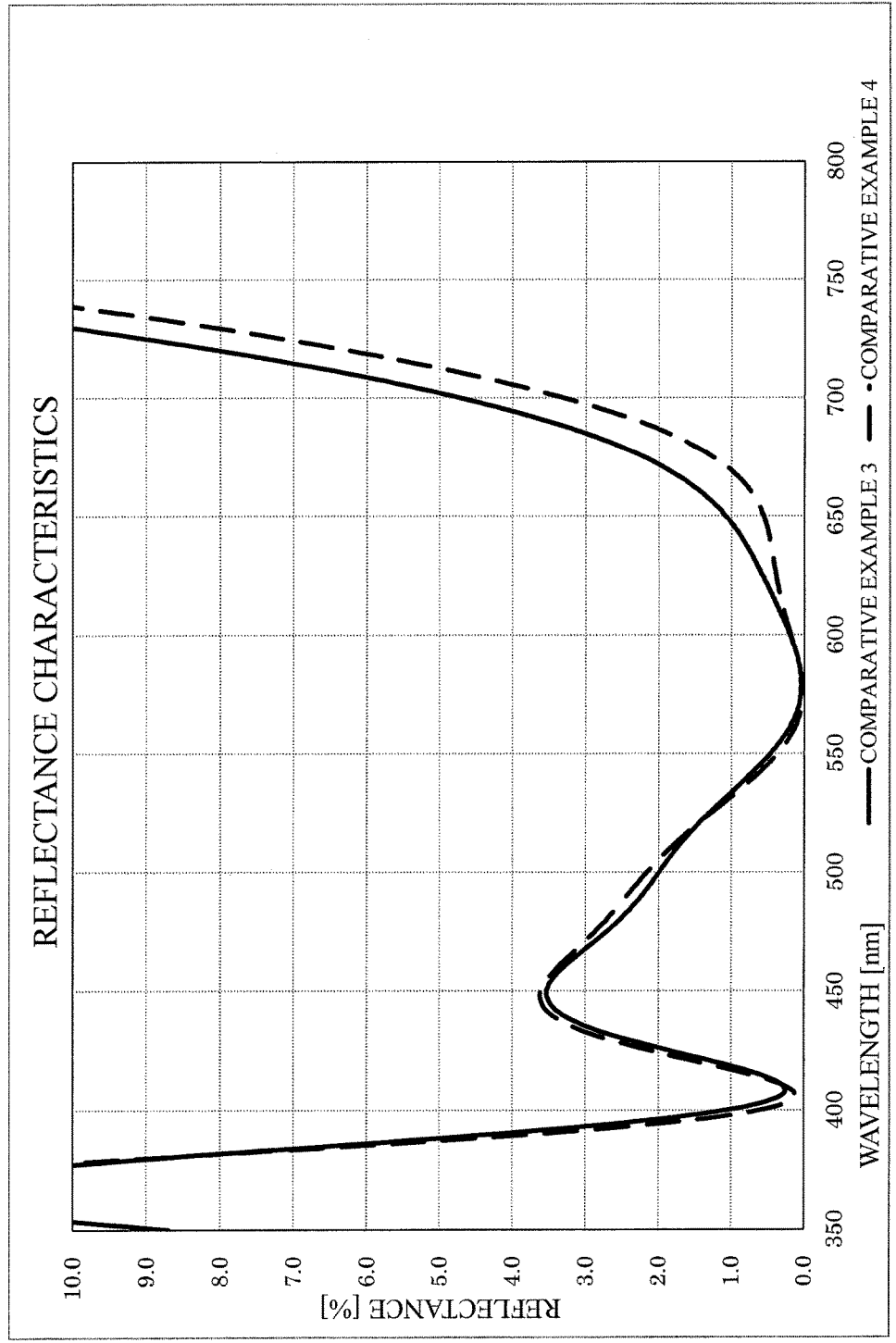
FIG. 12 is a graph showing the spectral reflectance distributions in the visible region according to Comparative examples 3 to 4.

FIGS. 1, 3, 5, 7, 9, and 11 show distribution of spectral reflectance of light from a visible region to a near-infrared region, and FIGS. 2, 4, 6, 8, 10, and 12 show the distribution of the spectral reflectance of the light in the visible region, for Examples 1 to 12 and Comparative examples 1 to 4. FIGS. 1 and 2 are for Examples 1 to 3, FIGS. 3 and 4 are for Examples 4 to 6, FIGS. 5 and 6 are for Examples 7 to 9, FIGS. 7 and 8 are for Examples 10 to 12, FIGS. 9 and 10 are for Comparative examples 1 and 2, and FIGS. 11 and 12 are for Comparative examples 3 and 4.

Further, in the distribution of reflectance shown in these drawings, the antireflective performance for light in the visible region and the cutting performance for light in the near infrared-region as described below, are indicated.

Next, in [Table 17], colors of reflected light, x values and y values in the CIE color system, and luminous reflectances in Examples 1 to 6 and Comparative examples 1 to 2 are indicated. In [Table 18], colors of reflected light, x values and y values in the CIE color system, and luminous reflectances in Examples 7 to 12 and Comparative examples 3 to 4 are indicated.

According to the color of reflected light, and the x value and the y value in the above-described Tables, it is indicated that the color of reflected light is green in Examples 1 to 6 and Comparative examples 1 and 2, and the color of reflected light is blue in Examples 7 to 12 and Comparative examples 3 and 4.

Further, according to the luminous reflectance in the above-described Tables, in any of examples and comparative examples, the luminous reflectance is less than or equal to 1.2%. Referring to the distribution of reflectance shown in FIGS. 1 to 12 as appropriate, it is found that antireflective properties are exhibited for light in the visible region. When the luminous reflectance is less than or equal to 2%, antireflective properties sufficient for improving visibility can be obtained.

TABLE 17

|  | Example 1 | Example 2 | Example 3 | Example 4 |
|---|---|---|---|---|
| Color of reflected light | Green | Green | Green | Green |
| CIE color system x | 0.22 | 0.23 | 0.19 | 0.22 |
| CIE color system y | 0.47 | 0.49 | 0.49 | 0.41 |
| Luminous reflectance [%] | 1.07 | 1.07 | 0.90 | 1.03 |

|  | Example 5 | Example 6 | Comparative example 1 | Comparative example 2 |
|---|---|---|---|---|
| Color of reflected light | Green | Green | Green | Green |
| CIE color system x | 0.22 | 0.20 | 0.23 | 0.21 |
| CIE color system y | 0.45 | 0.41 | 0.43 | 0.40 |
| Luminous reflectance [%] | 1.07 | 0.99 | 1.14 | 1.00 |

TABLE 18

|  | Example 7 | Example 8 | Example 9 | Example 10 |
|---|---|---|---|---|
| Color of reflected light | Blue | Blue | Blue | Blue |
| CIE color system x | 0.16 | 0.16 | 0.16 | 0.15 |
| CIE color system y | 0.17 | 0.16 | 0.19 | 0.17 |
| Luminous reflectance [%] | 0.88 | 0.92 | 0.98 | 0.84 |

|  | Example 11 | Example 12 | Comparative example 3 | Comparative example 4 |
|---|---|---|---|---|
| Color of reflected light | Blue | Blue | Blue | Blue |
| CIE color system x | 0.16 | 0.16 | 0.18 | 0.17 |
| CIE color system y | 0.16 | 0.16 | 0.15 | 0.14 |
| Luminous reflectance [%] | 0.79 | 0.73 | 0.77 | 0.72 |

Next, in [Table 19], an average reflectance of light in a near-infrared region (the wavelength is greater than or equal to 800 nm and not greater than 1500 nm) and a reflectance of light having the wavelength of 1000 nm in each of Examples 1 to 6 and Comparative examples 1 to 2 are indicated. In [Table 20], an average reflectance of light in a near-infrared region (the wavelength is greater than or equal to 800 nm and not greater than 1500 nm) and a reflectance of light having the wavelength of 1000 nm in each of Examples 7 to 12 and Comparative examples 3 to 4 are indicated.

According to the above-described Tables and FIGS. 1 to 12, in Comparative examples 1 to 4, the average reflectance of light in the near-infrared region is around 30%, and is 31.92% (Comparative example 3) at most. Meanwhile, in Examples 1 to 12, the reflectance is at least 35.27% (Example 10), and the reflectance is greater than or equal to 35% in any of Examples 1 to 12. In Examples 1 to 12, it is found that cutting performance for near-infrared rays is sufficient.

TABLE 19

|  | Example 1 | Example 2 | Example 3 | Example 4 |
|---|---|---|---|---|
| Average reflectance [%] at wavelength of 800 to 1500 nm | 46.03 | 45.19 | 41.51 | 35.98 |
| Reflectance [%] at wavelength of 1000 nm | 61.51 | 59.69 | 56.07 | 52.27 |

|  | Example 5 | Example 6 | Comparative example 1 | Comparative example 2 |
|---|---|---|---|---|

TABLE 19-continued

| | | | | |
|---|---|---|---|---|
| Average reflectance [%] at wavelength of 800 to 1500 nm | 37.85 | 35.42 | 31.88 | 29.12 |
| Reflectance [%] at wavelength of 1000 nm | 52.20 | 50.39 | 46.88 | 44.31 |

TABLE 20

| | Example 7 | Example 8 | Example 9 | Example 10 |
|---|---|---|---|---|
| Average reflectance [%] at wavelength of 800 to 1500 nm | 46.05 | 43.36 | 40.84 | 35.27 |
| Reflectance [%] at wavelength of 1000 nm | 61.80 | 59.78 | 56.70 | 51.47 |

| | Example 11 | Example 12 | Comparative example 3 | Comparative example 4 |
|---|---|---|---|---|
| Average reflectance [%] at wavelength of 800 to 1500 nm | 38.06 | 35.33 | 31.92 | 30.17 |
| Reflectance [%] at wavelength of 1000 nm | 53.19 | 50.23 | 47.65 | 44.86 |

In Comparative example 1, the physical film thickness (154.84 nm) of the fifth layer is greater than or equal to 145 nm and not greater than 165 nm, and the total (1.323λ) of the optical film thicknesses of the fourth to the sixth layers is greater than or equal to 1.3λ and not greater than 1.5λ. However, the refractive index (2.1071) of the high refractive index layers is less than 2.145. Thus, the average reflectance (31.88%) of light in the wavelength range in which the wavelength is greater than or equal to 800 nm and not greater than 1500 nm, is less than 35%, and the reflectance (46.88%) of light having the wavelength of 1000 nm is less than 50%. Therefore, the cutting performance for near-infrared rays is relatively poor.

In Comparative example 2, the physical film thickness (155.40 nm) of the fifth layer is greater than or equal to 145 nm and not greater than 165 nm. However, the total (1.279λ) of the optical film thicknesses of the fourth to the sixth layers is outside a range in which the total thereof is greater than or equal to 1.3λ and not greater than 1.5λ, and the refractive index (2.0577) of the high refractive index layers is less than 2.145. Thus, the average reflectance (29.12%) of light in the wavelength range in which the wavelength is greater than or equal to 800 nm and not greater than 1500 nm, is less than 35%, and the reflectance (44.31%) of light having the wavelength of 1000 nm is less than 50%. Therefore, the cutting performance for near-infrared rays is relatively poor.

Further, in Comparative example 3, the physical film thickness (145.11 nm) of the fifth layer is greater than or equal to 145 nm and not greater than 165 nm, and the total (1.394λ) of the optical film thicknesses of the fourth to the sixth layers is greater than or equal to 1.3λ and not greater than 1.5λ. However, the refractive index (2.1071) of the high refractive index layers is less than 2.145. Thus, the average reflectance (31.92%) of light in the wavelength range in which the wavelength is greater than or equal to 800 nm and not greater than 1500 nm, is less than 35%, and the reflectance (47.65%) of light having the wavelength of 1000 nm is less than 50%. Therefore the cutting performance for near-infrared rays is relatively poor.

In Comparative example 4, the physical film thickness (147.51 nm) of the fifth layer is greater than or equal to 145 nm and not greater than 165 nm, and the total (1.412λ) of the optical film thicknesses of the fourth to the sixth layers is within a range in which the total thereof is greater than or equal to 1.3λ and not greater than 1.5λ. However, the refractive index (2.0577) of the high refractive index layers is less than 2.145. Thus, the average reflectance (30.17%) of light in the wavelength range in which the wavelength is greater than or equal to 800 nm and not greater than 1500 nm is less than 35%, and the reflectance (44.86%) of light having the wavelength of 1000 nm is less than 50%. Therefore, the cutting performance for near-infrared rays is relatively poor.

Meanwhile, in each of Examples 7 to 12, the physical film thickness of the fifth layer is greater than or equal to 145 nm and not greater than 165 nm, and the total of the optical film thicknesses of the fourth to the sixth layers is greater than or equal to 1.3λ and not greater than 1.5λ, and, further, the refractive index of the high refractive index layers is greater than or equal to 2.145. Thus, the average reflectance, on one surface, of light in the wavelength range in which the wavelength is greater than or equal to 800 nm and not greater than 1500 nm, is greater than or equal to 35%, and the reflectance, on one surface, of light having the wavelength of 1000 nm is greater than or equal to 50%. Therefore, the cutting performance for near-infrared rays is advantageous.

When the physical film thickness of the fifth layer is less than 145 nm, the cutting rate for near-infrared rays becomes relatively insufficient. When the physical film thickness of the fifth layer is greater than 165 nm, designing for obtaining antireflective properties for light in a visible region, and the like becomes difficult, and cost for material, formation, and the like is increased. The effects as to the upper limit and the lower limit of the total of the optical film thicknesses of the fourth to the sixth layers are the same as the effects as to those of the physical film thickness of the fifth layer.

As in Examples 1 to 12, in the optical multilayer film having the seven-layer structure in which the low refractive index layers and the high refractive index layers are alternately layered, silica (silicon dioxide, $SiO_2$) is used for the low refractive index layers and a material having the refractive index that is greater than or equal to 2.145 for light having the wavelength of 500 nm is used for the high refractive index layers, the physical film thickness of the fifth layer (low refractive index layer) is greater than or equal to 145 nm and not greater than 165 nm, and the total of optical film thicknesses (λ=500 nm) of the fourth to the sixth layers (high refractive index layers) is greater than or equal to 1.3λ and not greater than 1.5λ. In this case, the formation is facilitated, durability can be improved, and cost can be reduced. Thus, a spectacle lens having sufficient antireflective performance for light in a visible region and having sufficient cutting performance for light in a near infrared region, can be provided.

Further, as in Examples 1 to 6, the reflected light can be colored (extremely light) green, and as in Examples 7 to 12, the reflected light can be colored (extremely light) blue. While the conditions of the layer structure of the optical multilayer film are satisfied, the reflected light can be colored with another color.

Spectacles that allow achievement of both antireflective properties for light in a visible region and cutting of near-infrared rays, can be produced by using the spectacle lens according to Examples 1 to 12. Further, an optical product, such as films for windows (buildings, vehicles, and the like), camera lens filters, and the like, having the same characteristics as those of Examples 1 to 12, can be produced.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An optical product comprising:
   a base; and
   an optical multilayer film provided on one or both of surfaces of a base;
   wherein the optical multilayer film
   has a seven-layer structure in which low refractive index layers and high refractive index layers are alternately layered,
   wherein the low refractive index layers are made of $SiO_2$,
   wherein high refractive index layers are made of a material with a refractive index for light having a wavelength of 500 nm that is greater than or equal to 2.145,
   wherein when a layer closest to the base is a first layer, a fifth layer is one of the low refractive index layers, and a physical film thickness of the fifth layer is greater than or equal to 145 nm and not greater than 165 nm, and
   wherein a total of optical film thicknesses ($\lambda$=500 nm) of a fourth layer, the fifth layer, and a sixth layer is greater than or equal to 1.3 $\lambda$ and not greater than 1.5 $\lambda$,
   whereby the optical product exhibits antireflective properties for light in a visible region and cuts near-infrared rays.

2. The optical product according to claim 1, wherein in the optical multilayer film,
   an average reflectance, on one surface, of light in a wavelength range in which a wavelength is greater than or equal to 800 nm and not greater than 1500 nm, is greater than or equal to 35%, and
   a reflectance, on one surface, of light having a wavelength of 1000 nm is greater than or equal to 50%.

3. The optical product according to claim 2, wherein in the optical multilayer film,
   a luminous reflectance is less than or equal to 2%.

4. The optical product according to claim 1, wherein in the optical multilayer film,
   a luminous reflectance is less than or equal to 2%.

5. A spectacle lens using the optical product according to claim 1.

6. Spectacles using the spectacle lens according to claim 5.

* * * * *